(12) United States Patent
Bok et al.

(10) Patent No.: US 6,340,075 B1
(45) Date of Patent: Jan. 22, 2002

(54) THREE RUN DISK BRAKE STACK AND METHOD OF ASSEMBLY

(75) Inventors: Lowell D. Bok, Anna; Eric J. Reed, Troy; Mark W. Prenger, Minster, all of OH (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/449,033

(22) Filed: Nov. 24, 1999

(51) Int. Cl.$^7$ .............................................. F16D 55/02
(52) U.S. Cl. ..................... 188/71.7; 188/71.5
(58) Field of Search ............... 188/71.5, 71.7, 188/218 XL

(56) References Cited

U.S. PATENT DOCUMENTS

| | | |
|---|---|---|
| 3,480,115 A | 11/1969 | Lallemant |
| 3,712,427 A * | 1/1973 | Cook et al. .............. 188/251 A |
| 4,018,082 A | 4/1977 | Manoliu et al. |
| 4,297,307 A | 10/1981 | Taylor |
| 4,341,830 A | 7/1982 | Betts et al. |
| 4,469,204 A | 9/1984 | Bok et al. |
| 4,613,017 A | 9/1986 | Bok |
| 4,658,936 A | 4/1987 | Moseley |
| 4,742,895 A | 5/1988 | Bok |
| 4,792,895 A | 12/1988 | Tallman |
| 4,804,071 A | 2/1989 | Schultz et al. |
| 4,878,563 A | 11/1989 | Baden et al. |
| 4,977,985 A | 12/1990 | Wells et al. |
| 4,982,818 A | 1/1991 | Pigford |
| 5,143,184 A | 9/1992 | Snyder et al. |
| 5,217,770 A | 6/1993 | Morris, Jr. et al. |
| 5,228,541 A | 7/1993 | Plude |
| 5,248,017 A | 9/1993 | Schwarzbich |
| 5,295,560 A | 3/1994 | Moseley |
| 5,312,660 A | 5/1994 | Morris et al. |
| 5,323,880 A | 6/1994 | Wells et al. |
| 5,401,440 A | 3/1995 | Stover et al. |
| 5,509,507 A | 4/1996 | Wells et al. |
| 5,546,880 A | 8/1996 | Ronyak et al. |
| 5,551,534 A | 9/1996 | Smithberger et al. |
| 5,609,707 A | 3/1997 | Bazshushtari et al. |
| 5,662,855 A | 9/1997 | Liew et al. |
| 5,759,622 A | 6/1998 | Stover |
| 5,779,006 A | 7/1998 | Hyde et al. |
| 5,992,577 A * | 11/1999 | Souetre ..................... 188/71.5 |

FOREIGN PATENT DOCUMENTS

| | | |
|---|---|---|
| CA | 2004091 | 5/1990 |
| FR | 2755094 | 10/1996 |

* cited by examiner

*Primary Examiner*—Robert J. Oberleitner
*Assistant Examiner*—Melody M. Burch
(74) *Attorney, Agent, or Firm*—David M. Ronyak, Esq.

(57) ABSTRACT

In the invention there is provided a disk brake stack having disks with predetermined available wear portions of a first thickness, a second thickness and a third thickness. In the initial configuration a first group of disks is interleaved with a second group of disks. The first group of disks comprises thick disks and the second group of disks comprises thin disks which have an available wear portion approximately one third of the thickness of the thick disks. At the first overhaul, the thin disks are substantially fully worn and are removed. The second group of disks is replaced with mid-thickness disks which have an available wear portion of about two thirds of the initial thickness of the wear portion of thick disks. At the second overhaul, the remaining wear portion of the first group of disks is approximately the thickness of the wear portion of the thin disks. The second group of disks are removed and replaced with thick disks. At the third overhaul, the first group of disks are removed and replaced with mid-thickness disks. At the fourth overhaul, the first group of disks are removed and replaced with thick disks. Also, the invention comprises a method of assembly and overhaul of a brake disk stack, utilizing disks having available wear portions of a first thickness, a second thickness and a third thickness.

17 Claims, 3 Drawing Sheets

☐ = THICK
▨ = MED.
▥ = THIN

THREE RUN DISK BRAKE STACK AND METHOD OF ASSEMBLY

FIELD OF INVENTION

This invention relates to braking systems. In particular, this invention relates to multi-disk brake systems used in vehicles. More particularly, this invention relates to aircraft disk brake systems. The brake disk assembly contains a brake disk stack, which comprises an end plate, a pressure plate and interleaved rotors and stators. The available wear portions of the rotors and stators have different wear thicknesses, so that the thickest disks in the stack are capable of being used for three service runs before being refurbished or replaced. Similarly, the available wear portions of the pressure plate and end plate each may have a different available wear portion thickness, which may be the same as the available wear portions of the stators and rotors. Therefore, with this configuration, the mid-thickness disks are replaced or refurbished after two service runs and the thin disks are replaced or refurbished after one service run. Furthermore, this invention relates to a method of assembly of a disk brake stack having disks of different thicknesses.

BACKGROUND OF THE INVENTION

Aircraft brake systems have brake disk stacks comprised of interleaved rotor and stator disks. The disks are alternatively splined to the rotatable wheel and stationary (non-rotatable) torque tube. An end plate is provided at one end of the stack, while an axially moveable pressure plate is provided at the other end of the stack. Upon application of force to the pressure plate, the disks frictionally engage and provide braking activity to the vehicle.

Generally in the past, brakes have been assembled with the available wear portions of the rotors and stators having the same available wear thickness. These brakes were operated until the wear portions of all of the disks were fully worn. At that time, all of the disks were removed and replaced with new unworn disks or refurbished or reworked disks. The heat sink mass of the brake is reduced by the total wear of all the disks in the brake stack. The heat sink mass must be above a certain level to hold the operating temperature of the brake down. Due to the size and weight limitations on aircraft, the thickness of available wear portions is also limited. The thickness of the available wear portions controls the number of landings between the replacement or refurbishing of the disks. The piston cylinder or other actuator assemblies for actuating the brakes also have a predetermined travel length, which is a function of the total wear of the disks. Where the brake is operated until all disks are fully worn, the actuator travel length is increased and accordingly the total brake envelope is increased as well as weight of the brake assembly. The brake envelope includes a heat sink envelope which is the distance between the end of the piston or thrust member facing the brake stack and the backing plate or reaction member at the opposite end of the brake stack.

Various different brake configurations have been proposed to minimize the turnaround time, maximize the brake cooling, reduce the amount of piston or actuator travel, as well as the size and the weight of the brake, while at the same time retaining a substantial portion of the heat sink mass to a lower operating temperature. For example, U.S. Pat. No. 3,480,115 to Lallemant discloses a brake, which comprises two groups of coaxial disks. The first group of coaxial disks is smooth since the disks are not equipped with a friction lining. The second group of disks has a friction lining. The disks of the first group are disposed alternatively with the disks of the second group. The disks of one group are angularly coupled to a rotatable structure such as an aircraft wheel and the disks of the other group are coupled to a non-rotating structure. Lallemant discloses various embodiments in which the disks of at least one of the two groups have thicknesses that vary from one disk to another depending upon the axial position of the disks. The thicker disks have greater thermal capacities due to their greater mass. According to Lallemant, the purpose of these various embodiments is to provide multiple disk brakes that fulfill the requirements of practice, particularly with respect to their longevity, uniformity of braking efficiency and conditions in which maintenance operations can be carried out. Furthermore, Lallemant contemplates the possibility of re-machining the smooth disks and moving these disks to a new axial position in the brake for which new axial position the reduced thickness that has been given to the smooth disks is adapted to the working conditions corresponding to the new position. Lallement alleges that the overall thermal capacity of the brake is not affected by the re-machining of the smooth disks and therefore, the efficiency of such brakes is constant.

U.S. Pat. No. 4,613,017 to Bok discloses a method of assembling and overhauling a disk brake having a plurality of disks with available wear portions of predetermined different thicknesses. The method comprises positioning first a first group of disks in overlapping relationship with a second group of disks. The first group of disks have an available wear portion of a first thickness and the second group of disks have an available wear portion of a second thickness which is greater than the thickness of the first group of disks. A third group of disks having a third thickness at an intermediate overhaul replace the first group of disks when the available wear portions of the first group of disks are substantially fully worn. The third group of disks have a third thickness which is greater than the thickness of each of the available wear portions of the second group of the disks at intermediate brake overhaul time.

Similarly, U.S. Pat. No. 4,742,895 to Bok discloses a carbon disk brake assembly. The assembly comprises a plurality of disks in which the first group of disks, for example, the stators and end plates, have an available wear portion of a first thickness which is less than and preferably one half of the thickness of the wear portions of the second group of disks, in this example, rotors. After a predetermined number of landings, the stators and end plates will be substantially fully worn. These worn stators and end plates are replaced by a third group of disks, which are new or refurbished stators and end plates. Preferably, the wear thickness of this third group of disks is double the thickness of the available wear portions of the rotors at the intermediate overhaul. The brake assembly is then operated to another intermediate overhaul when the available wear portions of the rotors will be fully worn and replaced by new or refurbished rotors.

U.S. Pat. No. 4,977,985 to Wells, et al. discloses a method of carrying out the maintenance of a multi-disk brake. The disks are made of a carbon-carbon material. The brake comprises a stack of interleaved rotor and stator disks provided between a thrust member and a reaction member. The rotor and stator disks are selected and arranged so that the wear allowance of a set of disks at one end of the stack is less than the wear allowance of a set of disks at the other end of the stack. A fully worn group of disks is removed from one end of the stack during brake service operation following wear. The remaining partially worn disks are axially moved or shifted to a new position towards the one end of the stack. An unworn stack of disks is added at the other end of the stack.

Similarly, U.S. Pat. No. 5,323,880 to Wells, et al. discloses a multi-disk brake system. The brake comprises a stack of interleaved rotor and stator disks disposed in an axially aligned relationship. The disks are made of a carbon-carbon material, which provides the frictional surfaces of the disk as well as their structural integrity. The stack of disks comprises a first group of adjacent rotors and stators and a second group of adjacent rotors and stators in an axially aligned relationship with the first group. Each wear surface of the first group which confronts a wear surface of an adjacent disk of the first group is unworn. Each wear surface of a disk of the second group which confronts a wear surface of an adjacent surface of the second group is partly worn. Each group has an end disk, which confronts an end disk of the other group. The confronting wear surfaces of the end disks are either both unworn or are both partly worn.

U.S. Pat. No. 5,509,507 to Wells et al. discloses a multi-disk brake system for aircraft. This brake system comprises a stack of interleaved rotor and stator disks made of carbon-carbon material and disposed in an axially aligned relationship between a thrust device and a reaction member. The stack comprises a first group of adjacent rotor and stator disks and a second group of adjacent rotor and stator disks with the two groups in an axially aligned relationship. Only one disk of the first group contacts a disk of the second group. Each group has an end disk which confronts an end disk of the other group. The wear surfaces of the disks of the first group are thicker than the wear surfaces of each of the disks of the second group. At an intermediate overhaul time, after a predetermined number of brake applications, each wear surface of the first group which confronts a wear surface of an adjacent disk of the first group is only partly worn away, whereas each wear surface of a disk of the second group which confronts a wear surface of an adjacent disk of the second group is substantially fully worn away. Also at the intermediate overhaul, the confronting wear surfaces of the end disks are either both only partly worn away or both substantially worn away.

U.S. Pat. No. 5,295,560 to Moseley discloses a thermally balanced brake stack. The brake stack comprises a plurality of stator disks, a plurality of rotor disks interleaved with said stator disks, a pressure plate at one end of the stack and an end plate at the other end of the stack. The rotor and stator disks at the first and second end are thinner than the rotor disks at the center portion of the stack. According to the patent, this configuration minimizes the rate of temperature increase at the center of the stack while enabling quicker dissipation of heat at the end of the brake disk stack.

A pressure balanced brake stack is disclosed in U.S. Pat. No. 5,551,534 to Smithberger et al. The brake stack comprises a plurality of rotor disks, a plurality of stator disks interleaved with said rotor disks, a pressure plate at a first end of the stack and an end plate at the second end of the stack. The rotor disks at the first and second ends of the stack are thicker than the rotor disks adjacent thereto. Due to this configuration according to the patentee, the rotor disks at the first and second ends will deflect less and distribute pressure more uniformly throughout the stack.

SUMMARY OF INVENTION

The present invention comprises a novel disk brake assembly construction. The disk brake is assembled with disks having three different wear portion thicknesses which enables the thickest disks to go through three service runs prior to being replaced or refurbished. A run is defined as a service operation, e.g., numerous brakings of a vehicle, between brake overhauls. A brake overhaul is made after a predetermined number of aircraft landings, or when the disks having the thinnest wear portions are fully worn. A brake wear limit indicator is preferably used to determine when a brake overhaul is necessary. Such wear limit indicators are known in the prior art. A common type uses a pin that retracts as the brake wears.

The brake stack includes, in addition to an end plate and pressure plate, rotors and stators. The end plate and pressure plate each have only one wear surface, while rotors and stators each have two wear surfaces. The rotors are interleaved with the stators. The rotors, stators, end plate and pressure plate are of three different sizes: a thick disk, a mid-thickness disk and a thin disk depending upon the configuration of the brake stack. The thick disks have an available wear portion of a first thickness. The mid-thickness disks have an available wear portion which is about two thirds of the available wear portion of the thick disks. The thin disks have an available wear portion which is about one third of the available wear portion of the thick disks.

Either all the rotors or all the stators in the brake stack are changed at each overhaul. Initially, in one embodiment, the brake stack can comprise thick stators and thin rotors and thick disks in the end plate and pressure plate positions. After the first service run, at the first overhaul, the thin rotors are removed and mid-thickness disks inserted into the rotor positions. The stators and the end plate and pressure plate which have been worn to become mid-thickness disks are reassembled into the overhauled stack. Therefore, after the overhaul, the brake stack comprises mid-thickness rotors and mid-thickness stators, pressure plate and end plate. After the second service run, at the second overhaul, the disks in the rotor positions are removed and replaced with thick disks. The stators are reassembled into the overhauled brake stack. The overhauled brake stack comprises thick rotors and thin stators, end plate, and pressure plate. After the third service run, at the third overhaul, the thin stators, end plate, and pressure plate are removed and replaced with mid-thickness disks. The brake stack is reassembled with the rotors which have been worn to become mid-thickness disks and mid-thickness stators. Also, at this third overhaul, the pressure plate and the end plate are replaced with mid-thickness disks. Following a fourth service run, at the fourth overhaul, the disks in the stator positions are removed and replaced with thick disks. Similarly, the pressure plate and the end plate are replaced with thick disks. The brake stack configuration after the fourth overhaul but prior to service is the same as the initial brake stack configuration.

By this configuration, a thick disk can go through three separate service runs prior to being replaced, where a mid-thickness disk can go through two service runs prior to being replaced and a thin disk can go through one service run prior to being replaced. If desired, at overhaul, following a service run, the disks can be moved to different positions within the stack or reversed. Alternatively, disks can be removed after a service run in a brake stack or be reinstalled in any other stack, they do not have to go back to the same stack. Therefore, this unique configuration provides for increased longevity of the individual disks of the brake stack, while maintaining the same heat sink envelope. This provides a substantial cost savings for replacement of worn disks since only the thin disks are replaced at each overhaul.

Alternatively, the invention provides additional design flexibility to a brake designer. Where the brake envelope remains constant, the configuration allows an increase in worn heat sink mass and associated increased energy capacity while maintaining the same disk life as in prior known brake stack configurations. If size and weight considerations dominate the brake design constraints, the brake envelope can be reduced. Using this inventive configuration, one can provide a more compact and lower weight brake assembly while maintaining the same disk life. Another alternative benefit of the inventive configuration is an increase in worn heat sink mass and associated energy capacity as well as increased disk life where the brake envelope and minimum disk thickness must remain constant.

In one aspect of the invention, there is provided a disk brake stack having disks with available wear portions of a first thickness, a second thickness and a third thickness. The brake disk stack comprises a first group of disks in overlapping relationship with a second group of disks. Depending upon the build of the stack, the disks of each group have a different thickness compared to the disks of another group. Initially, in one possible embodiment, the first group of disks comprises thick disks, whereas the second group of disks comprises thin disks. After the first service run, at the first overhaul, the second group of disks are substantially fully worn and are removed. The brake stack is reassembled with mid-thickness disks being placed into the positions of the second group of disks. The first group of disks had been worn to become mid-thickness disks. The brake stack is reassembled with the first group of disks and the second group of disks. The brake stack after this first overhaul comprises a first group of mid-thickness disks and a second group of mid-thickness disks. After the second service run, at the second overhaul, the second group of disks are removed and replaced with thick disks. The brake stack is reassembled and comprises a first group of disks that have been worn to be thin disks and a second group of thick disks. After a third service run, at the third overhaul, the first group of disks is substantially fully worn and removed and replaced with mid-thickness disks. The brake stack is reassembled with the first group of disks and the second group of disks, both having an available wear portion of mid-thickness disks. The brake stack comprises a first group of mid-thickness disks and a second group of mid-thickness disks. After a fourth service run, at the fourth overhaul, the first group of disks is removed and replaced with thick disks. The brake stack is reassembled and the configuration of the stack is the same as the initial brake configuration.

In accordance with another aspect of the invention, there is provided a method of assembling a brake disk stack having disks with available wear portions of three different predetermined thicknesses. Initially, in one embodiment, the brake stack comprises a first group of thick disks and a second group of thin disks in axially overlapping relationship with the first group of disks.

The disk(s) are subjected to a number of landings (based on the available wear portions of the disks having the least (thinnest) available wear portions) and then the brake stack is overhauled. At the first overhaul, after this first service run, the first group of disks is worn and become mid-thickness disks; the second group of disks are fully worn and removed. The second group of disks are replaced with mid-thickness disks. The brake stack now comprises a first group of mid-thickness disks, overlapping second group of mid-thickness disks. After a second service run, at the second overhaul, the first group of disks is worn and the disks of this group become thin disks as well as the second group of disks that are worn to become thin disks. The second group of disks are removed and saved since they can be used when thin disks are necessary. Thick disks are placed in the position of the second group of disks.

At the third overhaul, after a third service run, the first group of disks are replaced with mid-thickness disks. The brake stack is reassembled and the first and second group of disks both have available wear portions of the mid-thickness disks. After a fourth service run, at the fourth overhaul, the first group of disks are removed and replaced with thick disks. The brake stack now has the same configuration as the initial configuration.

For a complete understanding of the objects, techniques and structure of the invention, reference should be made to the following detailed description and accompanying drawings.

DETAILED DESCRIPTION

Figure 1:
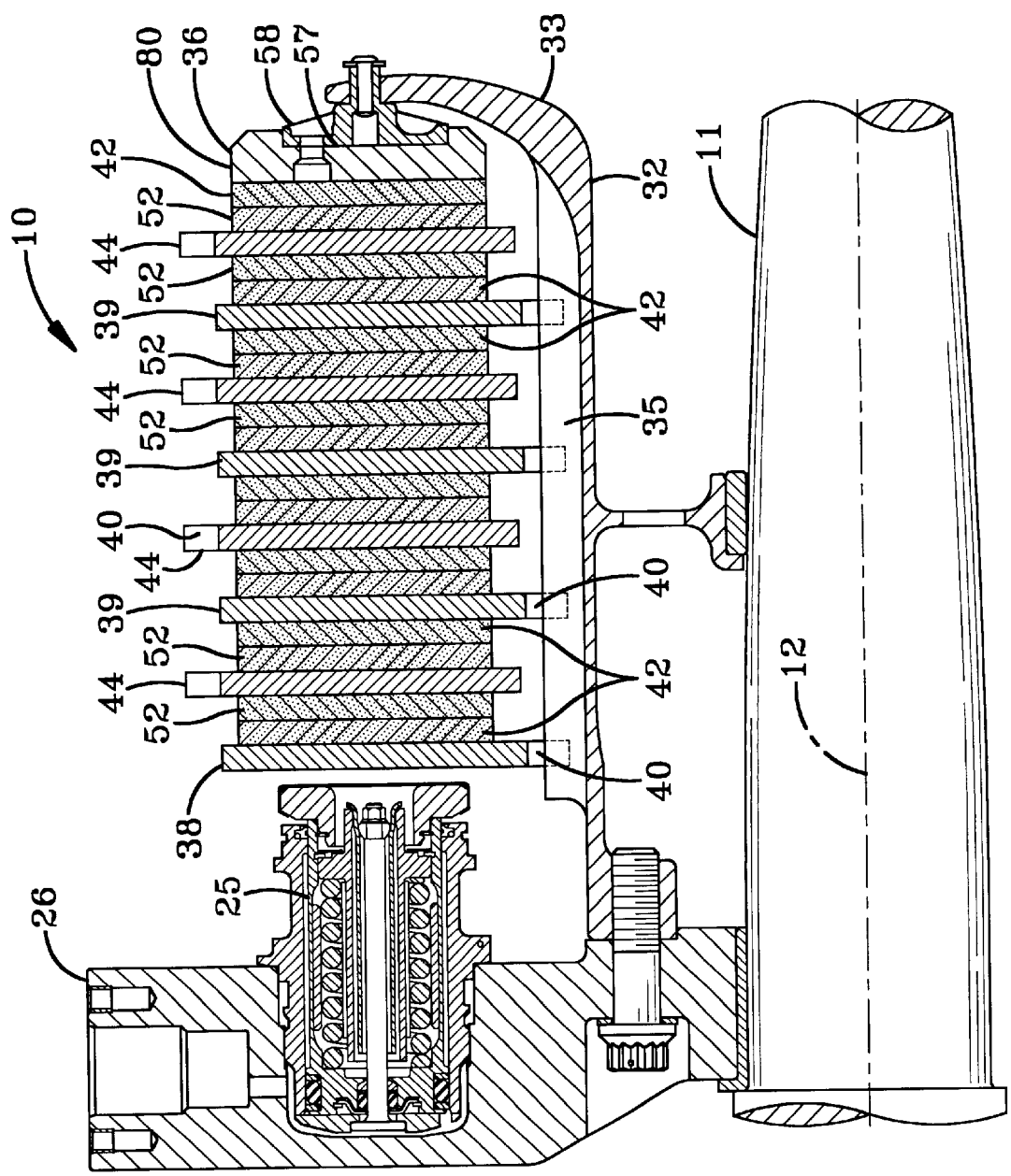
FIG. 1 is a schematic cross-sectional view of an aircraft brake assembly showing a piston housing with an actuating cylinder, pressure plate, torque tube and brake stack.

A friction brake mechanism 10 mounted on axle 11 for use with a cylindrical wheel (not illustrated) rotatable about axial centerline 12 in a manner fully described in U.S. Pat. No. 4,018,082 to Rastogi et al., U.S. Pat. No. 4,878,563 to Baden et al., and U.S. Pat. No. 5,248,013 to Hogue et al. is shown in FIG. 1. The friction brake mechanism 10 includes a pressure plate 38 adjacent a thrust member, preferably a hydraulic piston 25, an end plate 36 distal from the pressure plate, and a plurality of interleaved rotor disks 44 and stator disks 39 which together form the brake heat sink or brake stack disposed therebetween. The friction brake mechanism 10 also includes a torque tube 32 on which the pressure plate 38, and stator disks 39 are slidably mounted against rotation relative to the wheel and rotor disks 44. End plate 36 is also mounted against rotation relative to the wheel and rotor disks.

Torque tube 32 includes a reaction plate 33 at its end, distal the thrust member piston 25. The reaction plate 33 may be made integral with the torque tube 32, as shown in FIG. 1, or may be made as a separate annular piece and suitably connected to the stationary torque tube 32. Torque tube 32 has a plurality of circumferentially spaced splines 35 that are axially extending. Splines 35 on torque tube 32 support an axially moveable nonrotatable pressure plate 38 and axially moveable nonrotatable stator disks 39. Stator disks 39 and pressure plate 38 have notches 40 in the form of slotted openings at circumferentially spaced locations on their inner periphery for captive engagement by the spline members 35, as is old and well known in the art. In a preferred embodiment, the stator disks 39 each have friction linings secured to opposite faces. In such embodiment, the pressure plate face which abuts a rotor also has a friction lining on that surface. Similarly, in this embodiment, the end plate face which abuts a rotor has a friction lining.

Axially spaced rotor disks 44 are interleaved between the pressure plate 38, the stator disks 39 and end plate 36. The rotor disks have a plurality of circumferentially spaced notches 40 along their outer periphery for engagement by corresponding ribs secured to or integral with the inner periphery of the wheel in a known manner (not illustrated).

Stator disks 39 and rotor disks 44 act together during a braking action to provide a heat sink. The number and size of the disks used in the brake stack may be varied as is necessary for the application involved. The circumferentially spaced notches 40 on the stator disks and the rotor disks may accommodate reinforcing inserts which are fully described in U.S. Pat. No. 4,469,204 to Bok et al. The reinforcing inserts (not shown), sometimes referred to as drive clips, provide reinforcement to the walls of such slotted openings and enhance the life of such slots.

The actuating mechanism for the brake includes a plurality of hydraulic piston assemblies 25 circumferentially spaced around the annular piston housing 26 in a known manner. Only one piston assembly is shown in FIG. 1. Upon actuation by fluid pressure, the piston assembly 25 effects a braking action by moving the pressure plate 38 and the stator disks 39 into frictional engagement with the rotor disks 44 and against the reaction plate 33. Alternatively, other alternate means (not illustrated) such as an electromechanical actuator or thrust means may be provided to effect movement of the pressure plate.

The pressure plate 38 may be formed of the same material as the rotors and stators disposed therebetween and described below. Preferably, the pressure plate 38 is formed of carbon or ceramic composite material and has an annular friction lining 42 of carbon or ceramic composite material opposite to the face of a pressure plate that receives the head of the hydraulic piston 25. The pressure plate 38 is engaged to the torque tube 32 via slotted opening at circumferentially spaced locations on its inner periphery.

The construction of the end plate 36 is dependent on the design of the reaction end of the torque tube 32. As shown in FIG. 1, where the torque tube 32 includes a flared reaction end having a plurality of torque transfer buttons 58 secured thereto, the carrier 80 of the end plate 36 may be provided with a plurality of torque transfer recesses 57 for engagement with the plurality of torque transfer buttons 58. The end plate may have a friction lining 42 which may be secured to a plurality of rivets (not shown). Alternatively, and in known manner, where the design of the torque tube provides a series of splines for engagement by corresponding notches formed on the inner periphery of the carrier end plate, the end plate 36 may be of a construction similar or identical to that of the pressure plate 38.

The rotor disks and the stator disks are made of any material capable of maintaining the desired properties of the disk as well as the structural integrity of the disk upon repeated brake applications or aircraft landings. The disk may be a solid disk in which the entire disk is made of a single, integral piece of material that has both structural and frictional properties. Other examples of disks include steel brake disks, carbon disks, composite friction disks or any combination thereof. Such disks may be of solid or segmented construction. Illustrative, although not limiting examples of methods to form carbon brake disks are set forth in U.S. Pat. Nos. 5,143,184; 4,982,818; 4,804,071; 4,341,830; 4,297,307; 5,546,880; 5,662,855; 5,609,707; 5,312,660 and 5,217,770. These patents are listed solely as examples and are not intended to set forth the bounds and limitations of the brake disks which can be used in this invention. Furthermore, it may be desirable as well as preferable to include oxidation protection on disks that are made of carbon-carbon composites. Preferably, the oxidation of the brake disks is inhibited by the methods and compositions as set forth in U.S. Pat. Nos. 5,401,440 and 5,759,622, which are incorporated herein by reference.

Preferably, the available wear surface is a friction lining formed of any suitable material chosen primarily for its frictional, wear resistance, thermal conductivity, and heat capacity properties and secondarily for its structural and oxidation resistance properties. The friction lining can be formed of carbon, metallic and/or ceramic material.

In one preferred embodiment, composite friction brake disks having replaceable wear faces as described in U.S. Pat. No. 5,779,006 are used in the brake stack. The disks described in this patent are preferably used in the instant invention since the disk configuration improves the dynamic stability against undesired vibration of the brakes during aircraft braking. If disks employing such a replaceable friction lining are used, the friction lining is preferably in the form of an annular ring of a size corresponding to the respective disk. The friction lining may be attached by any suitable means available. For example, the friction lining, if annular, may be attached by rivets or clips. As shown in FIG. 1, each stator friction lining 42 has a flat annular wear face or rubbing face adapted for engagement with the opposing wear face of an adjacent rotor lining 52. An alternative design such as described in U.S. Pat. No. 5,779,006 could be used where the friction lining does not directly engage the drive keys of the wheel or splines of the torque tube so that the friction lining need not have the structural strength required of conventional disks formed entirely of carbon material.

As described herein, the invention contemplates a three-run overhaul scheme, meaning that a thick disk has a wear allowance which can be used for three full service runs before being replaced or refurbished. A brake wear limit indicator, as is well know in the art, can be used to determine when a brake overhaul is necessary. U.S. Pat. Nos. 5,228,541 and 4,658,936 include examples of such indicators. The rotors and stators of the disk brake assemblies taken collectively of the instant invention have three different thicknesses: a first thickness (thick), a second thickness (mid) or a third thickness (thin) depending upon the configuration of the stack. Similarly, the end plate and the pressure plate may have one or two or three different thicknesses, again depending upon the configuration of the brake stack. However, the end plate and pressure plate do not necessarily need to be the same thickness, or configuration, as the rotors and stators of the brake stack. Furthermore, the pressure plate and end plate can be removed at various or different intervals as desired in order to obtain the desired wear characteristics of the brake stack. The disk(s) having an initial available wear portion of a first thickness (1) go through three service runs before being replaced. The disks having an initial available wear portion of a second thickness (2) or mid-thickness disks have an available wear portion about equal to two-thirds of the initial wear portion and the first thickness disks. The mid-thickness disks are replaced after two service runs. The disks initially having an available wear portion of a third thickness (3) which is about equal to one-third of the available initial wear portion of the first thickness disks and are replaced by new or refurbished disks having an available wear portion of a first, second, or third thickness.

If the disks are formed as a single integral structure, such as that shown and described in U.S. Pat. Nos. 4,613,017 and 4,792,895 for example, it is contemplated that a refurbished disk can be formed by two worn disks joined together by any mechanical means to form a disk of desired thickness. For example, it is contemplated that a thick or mid-thickness disk can be formed by the mechanical joining of two thin disks. The thin disks are replaced at each overhaul, whereas mid-thickness disks go through two service runs before being replaced.

Moreover, the disks (except the pressure plate and the end plate) do not necessarily remain in the same position in the stack or in the same stack at each overhaul. Similarly, the pressure plate and end plate need not be reassembled into the same brake stack of each overhaul. Any of the partially worn disks can be moved to a different position in the stack or reversed or both or placed in another stack, if desired. However, disks that had been used as rotors must be reused as rotors as well as disks that had been used as stators must be reused as stators and in many constructions such as that shown in FIG. 1, the pressure plate and end plate must be used as such and cannot be reversed in position. Furthermore, if desired, the partially worn disks remaining in the stack can be machined so as to provide flat wear surfaces confronting adjacent disks of each newly assembled stack at each overhaul. The amount the partially worn disks are machined is predetermined depending upon the anticipated characteristic uneven wear pattern of the disks and incorporated into the determination of the initial thickness of the wear portion.

The exact thickness for the disks having an available wear portion of a first, second, and third thickness as well as the size and the number of disks varies greatly depending upon the exact aircraft the brake will be used in. The exact size and thickness dimensions are well within the skill of one of ordinary skill in the art. For purposes of an example, and not limiting the invention, the disk having an initial available wear portion of a first thickness can be about 1.80 inches thick. In this same embodiment, the disks having an initial available wear portion of a second thickness can be approximately 1.40 inches thick. The disks having an initial available wear portion of a third thickness can be approximately 1.00 inches thick. At the first overhaul, the thick disks are worn approximately 0.180 inches on each wear face to result in a disk having a wear portion approximately of the initial mid-thickness disk. In this particular embodiment, 0.020 inches is machined away from each wear face of each worn thick disk resulting in a disk having a wear portion the same as an initial mid-thickness disk. Similarly, at a first overhaul after being placed into the brake stack, the mid-thickness disks are worn approximately 0.180 on each wear face to result in a disk having wear portions approximately those of the initial third thickness disks. In this particular embodiment, 0.020 inches is machined away from each wear face of each worn mid-thickness disk, resulting in a disk having a wear portion the same as an initial third thickness disk. At the first overhaul after being placed into the brake stack configuration, the disks having an initial third thickness are substantially worn and discarded or refurbished.

FIG. 2 illustrates one possible 3-run scheme pursuant to this invention using a four-rotor disk configuration. The pressure plate (PP) is at one end of the brake assembly and the end plate (EP) at the other end of the stack. In all these configurations, the pressure plate and the end plate can remain in the same position for 3 runs. In the descriptions, EP refers to the end plate, PP refers to the pressure plate, R1, the first rotor, R2, the second rotor and so forth. Similarly, S1 and S2 refer to the first and second stators, respectively. For illustrative purposes only, the first rotor (R1) abuts the pressure plate as seen in the FIGS.

Figure 2A:
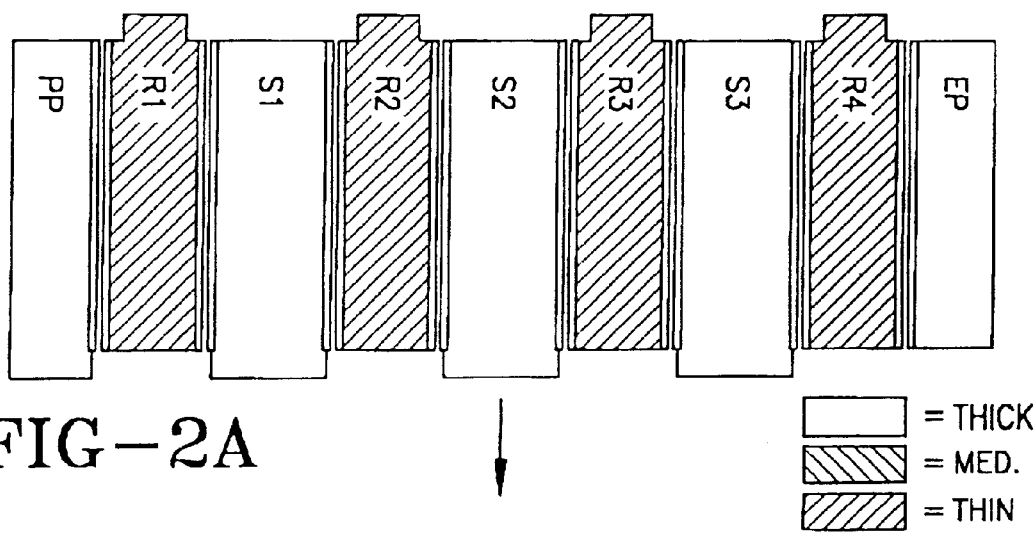
FIG. 2 is a flow chart representing a schematic of brake disks through four overhauls or service runs.
Figure 2B:
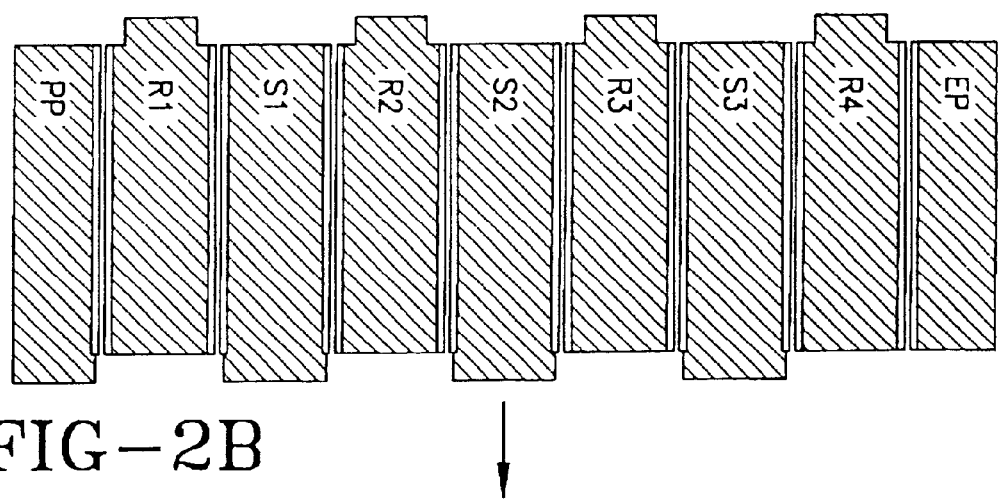

Initially, in this embodiment, the pressure plate and the end plate, as well as all the stators are formed of thick disks having available wear portions of a first thickness (3-run capable) (FIG. 2A). All the rotors are formed of thin disks (1-run capable). At the first overhaul, the rotors are all removed since they are substantially fully worn. The stators, as well as the end plate and the pressure plate are worn and become mid-thickness disks (2-run capable). The brake stack is reassembled with disks having a mid-thickness placed in the position of the rotors (FIG. 2B). If desired, all the disks remaining in the stack prior to the addition of the mid-thickness rotors can be machined and then installed in their respective positions. Similarly, if desired, the pressure plate and the end plate can be machined and reinstalled in the same position. This reassembled brake stack is shown in FIG. 2B and is a balanced brake stack. A balanced brake stack is one where all the rotors and all the stators have approximate equal wear portions.

Figure 2C:
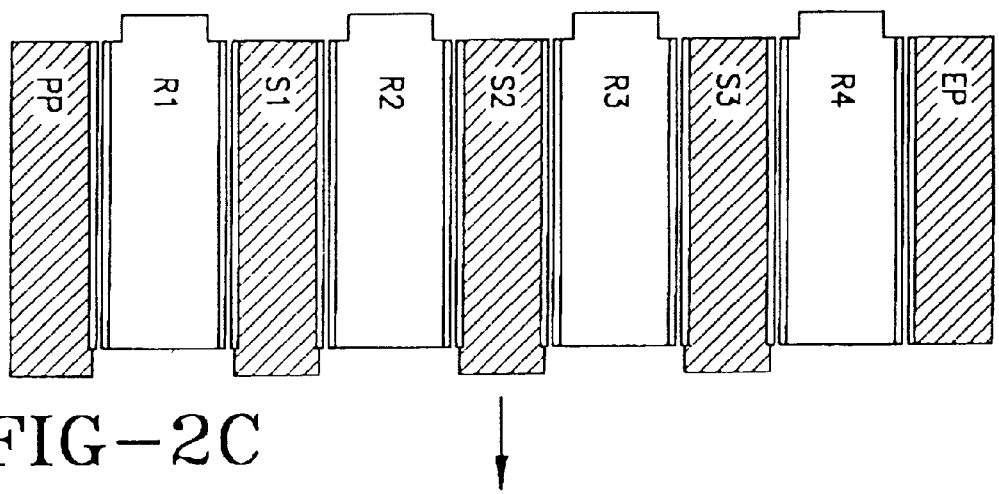

At the second overhaul, the rotors are removed from the brake stack and separated for use in another brake stack or for use in this brake stack when thin disks are necessary. Disks having an available wear portion of the thick (3-run) disks are placed in the positions of the rotors. The stators and the end plate and the pressure plate have been worn and at this overhaul, the disks in these positions have an available wear thickness of the thin disks. If desired, these disks can be machined and then installed into their respective positions. This reassembled brake stack is shown in FIG. 2C.

Figure 2D:
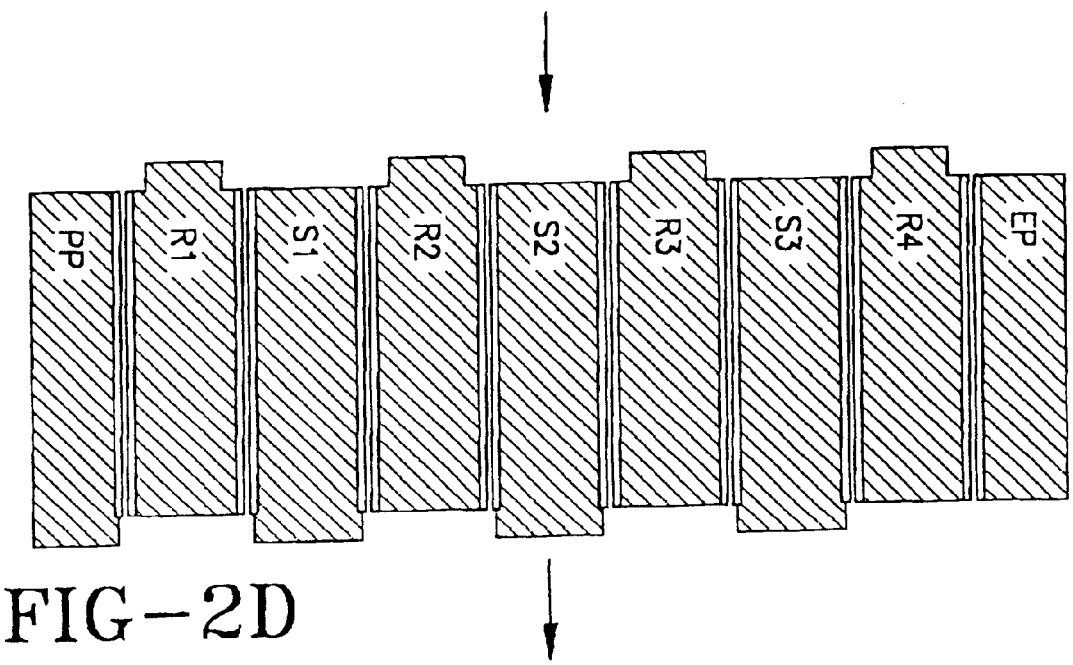

At the third overhaul, the pressure plate, end plate and the stators are substantially fully worn and removed. Disks having an available wear portion of mid-thickness disks (2-run capable) are placed into these positions. At this overhaul, the disks in the rotor positions have been worn and have an available wear portion of about the mid-thickness disks. If desired, these disks can be machined prior to their reinstallation into these positions. This reassembled brake stack is shown in FIG. 2D and is a balanced brake stack.

Figure 2E:
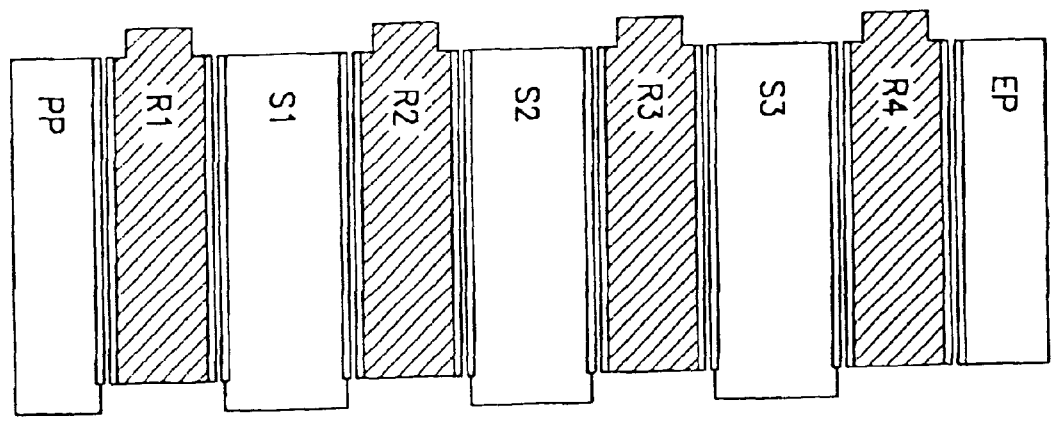

At the fourth overhaul, the stators which have an available wear portion equal to the thin disks are removed and separated. These disks can be used in some other brake stack that requires their disks, if desired. Thick disks are placed in the stator positions. The end plate and the pressure plate are removed and separated for use in another stack. Thick disks are placed in the position of the end plate and the pressure plate. At this point, the brake disk configuration is the same as the initial configuration of the brake disk system (FIG. 2E).

As seen from these various embodiments, it is possible to rearrange the disks for each configuration provided that the minimum disk thickness and overall heat sink length and mass meet the specified requirement for each configuration. Furthermore, orientation of the disk wear surfaces is not critical, if the wear surfaces of the disks are machined at each overhaul. Preferably, the disks are machined flat prior to reuse in another brake stack. With the re-machining, the disk has no record of its past position and can be used in any other brake stack.

The invention also contemplates the method of assembling and overhauling a disk brake having disks of three different wear portion thicknesses. The brake disk is assembled by positioning a first group of disks in an overlapping position with a second group of disks between an end plate and a pressure plate. The pressure plate, end plate and the first group of disks comprise thick wear portion disks. The second group of disks comprise thin wear portion disks. At a first overhaul, the available wear portions of the thin disks are substantially fully worn and the disks are replaced with mid-thickness disks. The first group of disks as well as the pressure plate and the end plate have been worn and at this overhaul have an available wear portion about equal to the available wear portion of the mid-thickness disks. The brake stack is reassembled with the first group of disks and the second group of disks comprising mid-thickness disks.

At the second overhaul, the second group of disks are replaced with thick disks. The first group of disks has been worn and now has the available wear portion of thin disks. The brake stack is reassembled with the first group of disks comprising thin disks and the second group of disks comprising thick disks.

At the third overhaul, the first group of disks are removed. These disks can be refurbished for further use in this brake stack or another brake stack. Disks having an available wear portion of mid-thick disks are placed in the positions of the first group of disks. Similarly, mid-thickness disks are placed in the positions of the end plate and the pressure plate. At the fourth overhaul, the first group of disks are worn and have an available wear portion of about the thin disks. This first group of disks are removed and separated for use in another brake stack or for use in the brake stack when these particular disks are desired or necessary. Thick disks are placed into the position of the first group of disks. Also, thick disks are placed in the positions of the end plate and pressure plate. The configuration of brake stack is now the same as the initial brake stack configuration.

An aircraft brake assembly incorporating the novel configuration according to the instant invention is much more economical than conventional aircraft brake assemblies. If the disks are constructed as described in U.S. Pat. No. 5,779,006, the structural carrier or core of each disk can be reused if desired since, the disks are refurbished by the placement of new friction lining.

Furthermore, it is believed that the novel configuration of brake disks can be used in any braking device.

In summary, a novel and unobvious brake disk stack has been described, as well as the method of assembly of a disk brake having disks of three different wear portion thicknesses so that the thickest disk is replaced or refurbished after the third service run. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

We claim:

1. A brake disk assembly comprising an end plate, a pressure plate and rotor and stator disks axially aligned and disposed therebetween, wherein said brake disks comprise disks of a first group and disks of a second group in an axially aligned and interleaved relationship, each of the disks of the first group and said second group having oppositely disposed wear surfaces, each disk in said first group of disks having an initial available wear portion of a first thickness and each disk in said second group of disks having an available wear portion of a second thickness, said second thickness being approximately one third of the first thickness, whereby at an overhaul, the available wear portions of the second group of disks are substantially fully worn away and the available wear portions of the first group of disks are approximately two thirds of the initial first thickness and said second group of disks is replaced by a group of disks having approximately two thirds of the wear thickness of the initial first thickness of said first group of disks, whereby said first and said second replacement groups of disks are of approximately the same thickness.

2. A brake disk assembly according to claim 1, wherein the disks of the first group are rotor disks only.

3. A brake disk assembly according to claim 1, wherein the disks of the first group are stators only.

4. A brake disk assembly according to claim 1, wherein said end plate and said pressure plate have an initial available wear portion equal to the initial available wear portion of said first group of disks.

5. A brake disk assembly according to claim 1, wherein said end plate and said pressure plate have an initial available wear portion equal to the initial available wear portion of said second group of disks.

6. A brake disk assembly according to claim 1, wherein all the brake disks of the first group and second group are positioned in an envelope space within said disk brake assembly, said brake assembly having an actuator for urging said disks together to provide braking.

7. A method of assembling and overhauling a disk brake having a brake stack comprising an end plate, a pressure plate and a plurality of rotor and stator disks with different available wear portions comprising a first group of disks in axially aligned and interleaved overlapping relationship with a second group of disks, each disk of said first group of disks having an initial available wear portion of a first thickness and each disk of said second group of disks having an available wear portion which is substantially about one third of the available wear portion of the first group of disks, at a first overhaul, removing and replacing said second group of disks with disks having an available wear portion approximately two thirds of said first thickness of said first group of disks, whereby said first group of disks and said second replacement group of disks are approximately the same thickness.

8. A method according to claim 7, whereby at a second overhaul following a second service run, the available wear thickness of the first group of disks is about one third of the initial available wear portion of said first group of disks, removing said second group of disks and replacing said second group of disks with disks having an available wear portion approximately equal to the initial available wear portion of said first group of disks.

9. A method according to claim 8, whereby at a third overhaul following a third service run, said first group of disks are removed and replaced with disks having an available wear portion about two thirds of the initial available wear portion of said first group of disks.

10. A method according to claim 9, whereby at a fourth overhaul following a fourth service run, said second group of disks are removed and replaced with disks having an available wear portion equal to the initial wear portion of said first group of disks.

11. A method according to claim 8, wherein said second group of disks which has been removed from the brake stack are reassembled into a separate brake assembly in an axially aligned interleaved relationship with a third group of disks having an initial available wear portion of said first group of disks.

12. A method according to claim 7, wherein said disks of said first group are the pressure plate, end plate and the stator disks dispersed therebetween.

13. A method according to claim 7, wherein the disks of the first group are rotors only.

14. A method according to claim 7, wherein the disks of the first group are stators only.

15. A method according to claim 7, wherein the end plate and pressure plate have the same available wear portion as said first group of disks.

16. A method according to claim 7, wherein said end plate and pressure plate have a different available wear portion than said first and second group of disks.

17. A method according to claim 7, wherein said end plate and pressure plate have the same available wear portion as said second group of disks.

* * * * *